(12) United States Patent
Stuttaford et al.

(10) Patent No.: US 9,927,124 B2
(45) Date of Patent: Mar. 27, 2018

(54) FUEL NOZZLE FOR AXIALLY STAGED FUEL INJECTION

(71) Applicant: ANSALDO ENERGIA SWITZERLAND AG, Baden (CH)

(72) Inventors: Peter Stuttaford, Jupiter, FL (US); Chiluwata Lungu, Atlanta, GA (US); Sumit Soni, Jupiter, FL (US); Nicolas Demougeot, Stuart, FL (US); Justin Bosnoian, Juno Beach, FL (US); Kevin B. Powell, Jupiter, FL (US); Paul Economo, Jupiter, FL (US)

(73) Assignee: ANSALDO ENERGIA SWITZERLAND AG (CH)

( * ) Notice: Subject to any disclaimer, the term of this patent is extended or adjusted under 35 U.S.C. 154(b) by 403 days.

(21) Appl. No.: 14/669,077

(22) Filed: Mar. 26, 2015

(65) Prior Publication Data

US 2016/0281990 A1   Sep. 29, 2016

(51) Int. Cl.
| | |
|---|---|
| *F02C 1/00* | (2006.01) |
| *F23R 3/28* | (2006.01) |
| *F02C 7/22* | (2006.01) |
| *F23R 3/34* | (2006.01) |
| *F23R 3/14* | (2006.01) |

(52) U.S. Cl.
CPC .............. *F23R 3/286* (2013.01); *F02C 7/22* (2013.01); *F23R 3/14* (2013.01); *F23R 3/346* (2013.01)

(58) Field of Classification Search
USPC .............. 60/734, 737, 738, 748, 751, 772
See application file for complete search history.

(56) References Cited

U.S. PATENT DOCUMENTS

| | | | | |
|---|---|---|---|---|
| 5,351,477 | A * | 10/1994 | Joshi ................. | F23C 7/004 239/400 |
| 8,104,286 | B2 * | 1/2012 | Zuo .................... | F23R 3/14 239/399 |
| 8,171,734 | B2 * | 5/2012 | McMasters .......... | B23P 6/007 60/748 |
| 2012/0285178 | A1 * | 11/2012 | Pennewitz ........... | E21B 36/001 62/3.1 |
| 2014/0013764 | A1 * | 1/2014 | Biagioli ............... | F23R 3/14 60/748 |
| 2014/0238025 | A1 * | 8/2014 | Uhm .................... | F23R 3/14 60/737 |
| 2015/0082796 | A1 * | 3/2015 | Andersson ........... | F23R 3/14 60/746 |

\* cited by examiner

*Primary Examiner* — Binh Q Tran
(74) *Attorney, Agent, or Firm* — Hovey Williams LLP (57) ABSTRACT

The present invention discloses a fuel nozzle assembly and method for axially staging fuel injection. The fuel nozzle assembly comprises a plurality of vanes connected to a core, with an annular ring connectedly surrounding the plurality of vanes. Fuel is directed through the core and then through the vanes and is injected at different axial planes generally perpendicular to an oncoming air stream to obtain a broad spectrum of gas residence time between the point of fuel injection and the flame.

18 Claims, 9 Drawing Sheets

FUEL NOZZLE FOR AXIALLY STAGED FUEL INJECTION

CROSS-REFERENCE TO RELATED APPLICATIONS

Not applicable.

TECHNICAL FIELD

The present invention relates generally to an apparatus and method for axially staging fuel injection in a gas turbine combustor. More specifically, a fuel nozzle swirler is provided with a plurality of vanes for axially staging fuel injection.

BACKGROUND OF THE INVENTION

Gas turbine engines operate to produce mechanical work or thrust. Specifically, land-based gas turbine engines typically have a generator coupled thereto for the purposes of generating electricity. An enhancement in combustion technology is the concept of premixing fuel and air prior to combustion to form a homogeneous mixture that burns at a lower temperature. An example of a premixing combustor uses a plurality of fuel nozzles to inject fuel into a premix chamber where it mixes with compressed air before entering a combustion chamber. Premixing fuel and air together before combustion allows for the fuel and air to form a more homogeneous mixture prior to ignition.

More specifically, a fuel nozzle can include a swirler to aid in mixing the fuel. A swirler can include a plurality of vanes extending from the nozzle. However, the exact design and fuel injection locations can vary depending on the design parameters of the fuel nozzle and the combustor such as desired mixing level and convective delay time, to name a few.

SUMMARY

The present invention discloses a novel fuel nozzle apparatus and method for axially injecting fuel into a combustor. The fuel nozzle assembly comprises a plurality of vanes extending radially outward from a core, and an annular ring connectedly surrounding the plurality of vanes. Fuel is injected from the fuel nozzle assembly to flow primarily in an axial direction relative to oncoming air flow through the vanes to obtain a broad spectrum of gas residence time between the point of fuel injection and the flame front while controlling the fuel-air ratio profile at the exit of the nozzle. The residence time of fuel concentration wave in the premixer should be suitably long for providing premixing and pre-vaporization for obtaining low NOx combustion. Each vane includes a plurality of apertures staggered axially at different planes along the vane, with each aperture connected to a passageway within each vane. Each vane further includes an appendage comprising a trailing edge defining a bend upstream stretching proximate a rear flange member of the core and a trunk comprising a leading edge defining a bevel extending upwardly from proximate a front flange member of the core. In embodiments of the present invention, the position and sizes of each of the plurality of apertures may be tuned to target a desired fuel-air ratio profile at the exit of the fuel nozzle.

In an alternate embodiment of the present invention, a fuel nozzle assembly in a gas turbine combustor is disclosed. The fuel nozzle assembly includes a core extending along a center axis from a rear flange member to a front flange member defining an annular passageway. The annular passageway comprises a first coaxial annular tube and a second coaxial annular tube. The first coaxial annular tube comprises a series of perforations circumferentially staggered around a rim of the first coaxial annular tube. A plurality of vanes are connected to the core with each of the plurality of vanes having a plurality of apertures staggered axially on different planes along each vane, each of the plurality of apertures connected to a passageway within each vane. Each of the plurality of vanes further includes an appendage comprising a trailing edge defining a bend upstream stretching proximate a rear flange member of the core. Each vane also includes a trunk comprising a leading edge defining a bevel extending upwardly from proximate a front flange member of the core. An annular ring connectedly surrounds the plurality of vanes at an attachment portion of each vane.

In yet another embodiment of the present invention, a method of axially staging fuel injection in a fuel nozzle is provided. The method includes providing a flow of fuel into the fuel nozzle having a plurality of vanes connected to a core. The plurality of vanes comprise a plurality of apertures staggered at different axial planes along each vane, each of the plurality of apertures connected to at least one of a plurality of passageways within each vane. An appendage comprising a trailing edge defining a bend upstream stretches proximate a rear flange member of the core and a trunk comprising a leading edge defining a bevel extends upwardly from proximate a front flange member of the core, the trunk connected wholly at an attachment portion to an annular ring connectedly surrounding the plurality of vanes. The method further comprises directing fuel into a leading edge passageway for an outer premix through at least two of the plurality of apertures. The method also comprises directing fuel into a rear passageway for an inner premix through at least one of the plurality of apertures.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
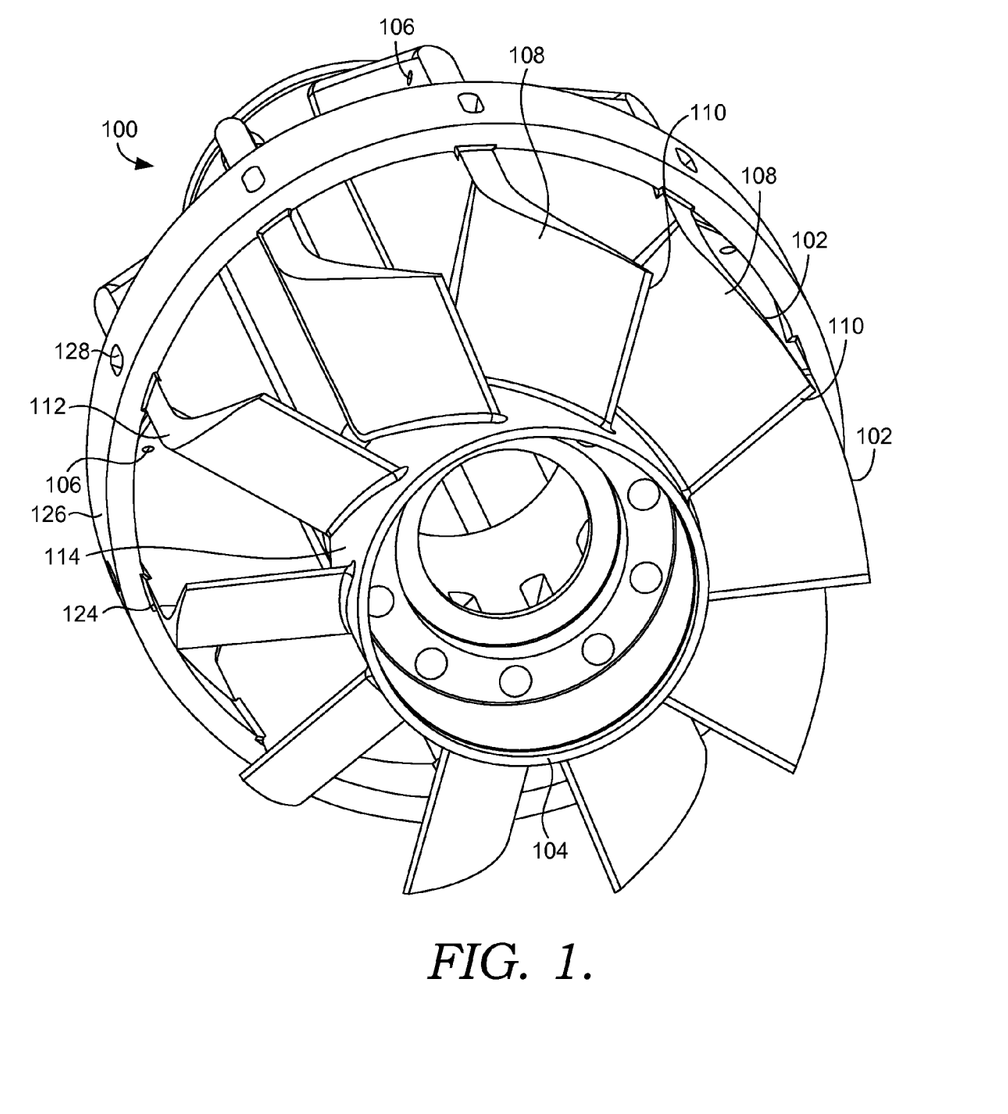
FIG. 1 is a perspective view of a swirler for a fuel nozzle assembly in accordance with an embodiment of the present invention.
Figure 2:
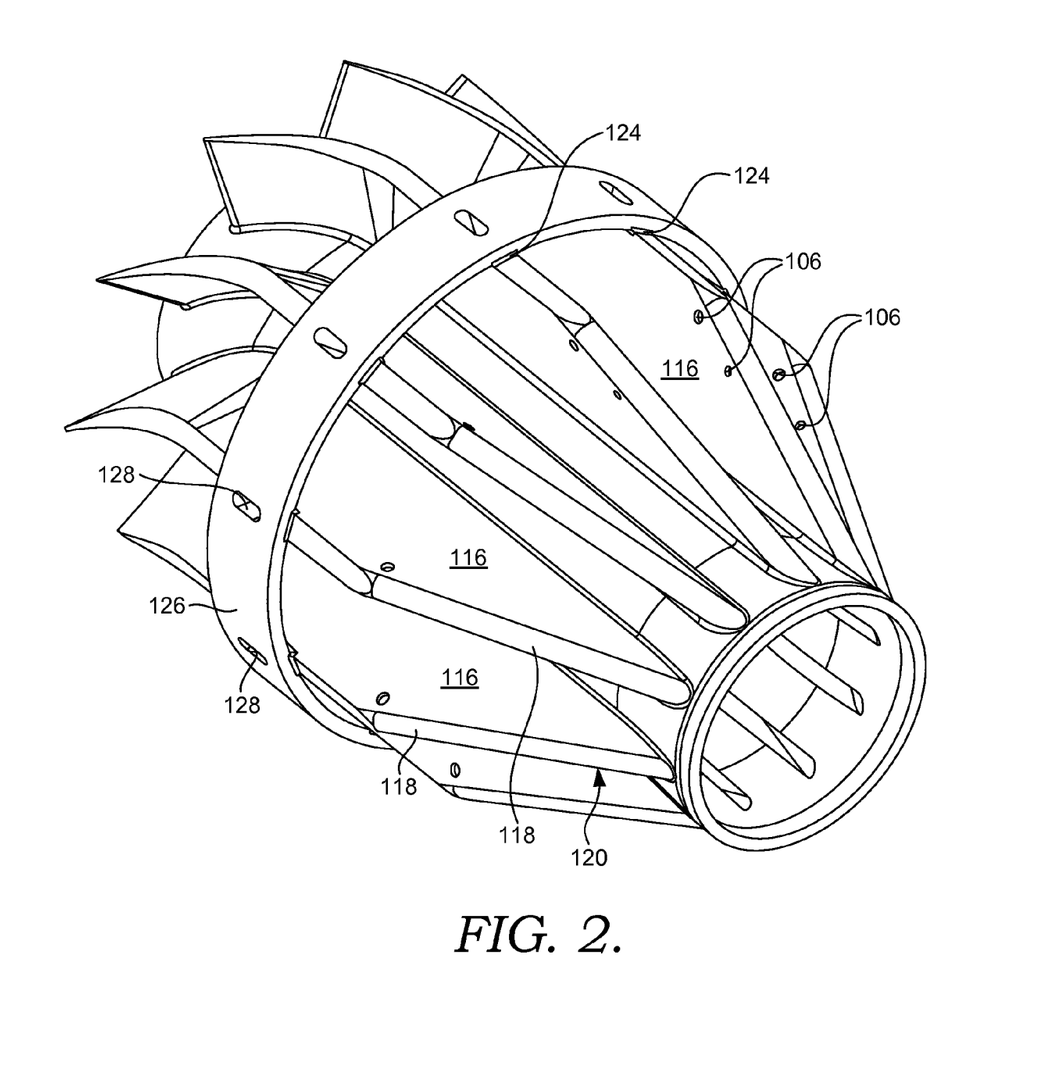
FIG. 2 is an alternate perspective view of a swirler for a fuel nozzle assembly in accordance with an embodiment of the present invention.

Referring initially to FIGS. 1 and 2, fuel nozzle swirler assembly ("swirler") 100 is shown in a front and rear perspective view respectively. The swirler 100 includes a plurality of vanes 102 connected to a core 104. Each vane of the plurality of vanes includes a plurality of apertures 106 staggered axially along each vane 102. The plurality of apertures 106 may be staggered on different planes of the vane. Each of the plurality of apertures 106 may be connected to a passageway (not shown) within each vane 102. However, the vanes 102 may be defined without passageways therein. The apertures 106 extend from a first side of the vane 102 and a second side of the vane 102.

The swirler 100 further comprises an appendage 108 to the vanes 102, the appendage 108 comprises a trailing edge 110 defining a bend portion 112 upstream stretching proximate a rear flange 114 of the core 104. The swirler 100 also includes a trunk portion 116 comprising a leading edge 118 defining a bevel 120 extending upwardly from proximate a front flange member of the core. Leading edge bevel 120 may be further defined as an angle from proximate the front flange member of the core in a generally angular direction of approximately 90-165 degrees. Further, the trunk portion 116 is connected at an attachment portion 124 to an annular ring 126 and surrounds the plurality of vanes 102. A portion of the trunk portion 116 of each of the plurality vanes 102 may wholly define the attachment portion 124 between the annular ring 126 and the plurality of vanes 102. Each opening of a plurality of openings 128 on the annular ring 126 defines an annular ring attachment portion to a corresponding trunk attachment portion forming a channel to at least one passageway of a corresponding vane.

Figure 3A:
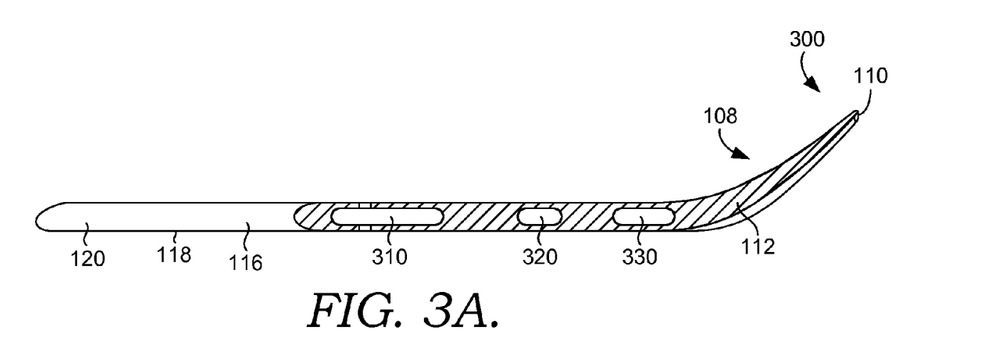
FIG. 3A is a top cross section view of a swirler vane in accordance with an embodiment of the present invention.
Figure 3B:
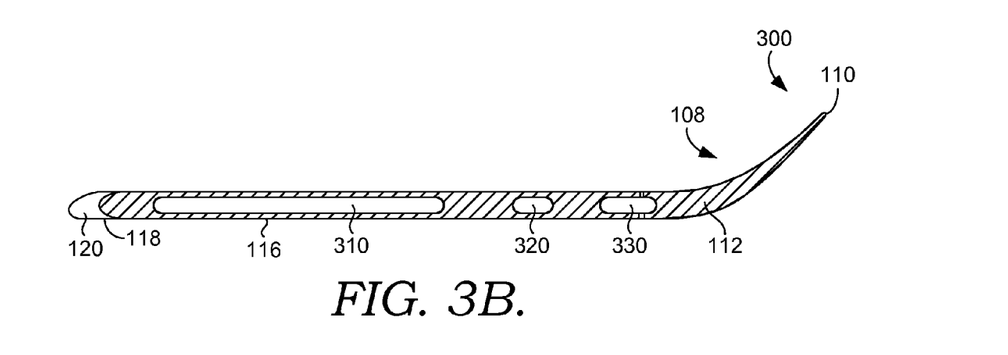
FIG. 3B is a bottom cross section view of a swirler vane in accordance with an embodiment of the present invention.
Figure 4:
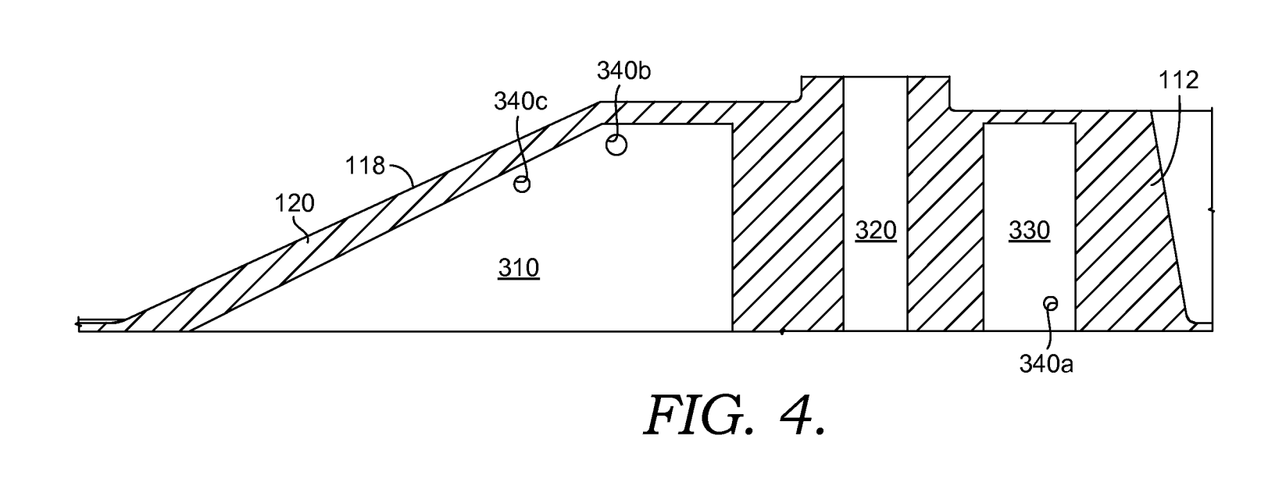
FIG. 4 is a cross section view of a swirler vane in accordance with an embodiment of the present invention.

Turning to FIGS. 3A and 3B, an exemplary vane 300 is depicted in a top cross section and a bottom cross section view respectively. The vane 300 comprises a plurality of passageways 310, 320, and 330. The plurality of passageways include a leading edge passageway 310, a middle passageway 320, and a rear passageway 330. The leading edge passageway 310 defines an expanding channel increasing in volume downwardly from a radially outer portion of the trunk 116 to a bottom portion of the trunk, as best shown in FIG. 4. The expanding channel of the leading edge passageway 310 corresponds at least in part to the bevel 120 of the leading edge 118. In an embodiment of the invention, the vane 300 includes first apertures 340a, a second apertures 340b, and a third apertures 340c. Each of the plurality of apertures may be located on different horizontal and/or vertical planes with reference to the trunk portion 116 of the vane. By way of example, the first aperture 340a is located at a bottom portion of the trunk portion 116 proximate the bend portion 112 of the appendage 108. The second aperture 340b and the third aperture 340c are located at different radial heights along the bevel 120 proximate the leading edge 118 of the trunk 116 and are in communication with the leading edge passageway 310. It is contemplated that the position and size of each of the plurality of apertures may be tuned to target a fuel-air ratio profile at the exit of the fuel nozzle. In particular, the second aperture 340b may be located proximate to a top portion of the trunk 116 of the vane with the third aperture 340c located radially inward from the second aperture 340b of the trunk of the vane.

As shown in FIG. 4, the rear passageway 330 is substantially rectangular in shape. The rear passageway 330 may be connected to a first aperture 340a at the bottom portion of the trunk. The rear passageway 330 is located proximate the bend portion 112 of vane 102. The middle passageway 320 is also substantially rectangular in shape. In one embodiment, the middle passageway 320 may be wider than the rear passageway 330. An attachment portion connects the middle passageway 320 of the trunk portion to an opening of an annular ring 126 surrounding the plurality of vanes 102.

Figure 6:
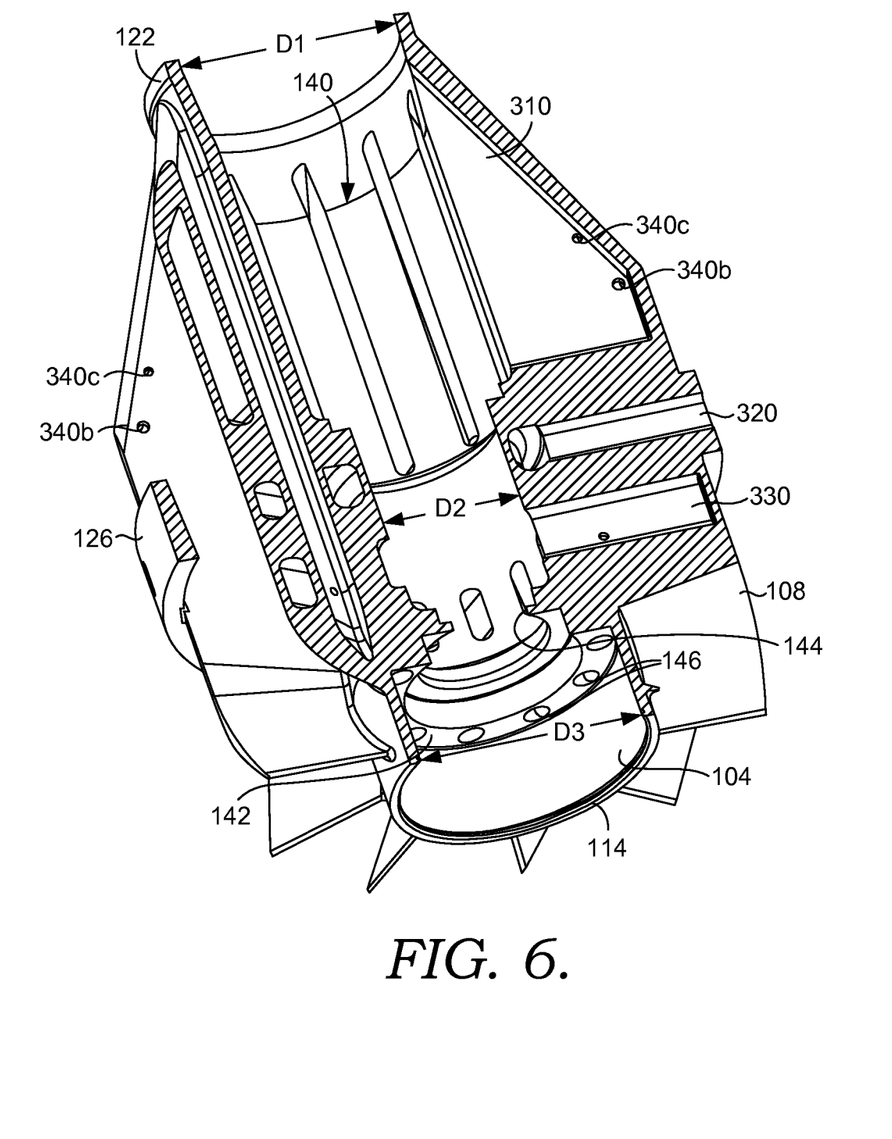
FIG. 6 is an alternate cross section view of the swirler in accordance with an embodiment of the present invention.

Turning to FIG. 6, the swirler is shown in a cross section view. The core 104 comprises a rear flange member 114 and the front flange member 122. The rear flange member 114 extends to the front flange member 122 defining an annular passageway 140 of the core 104. The leading edge passageway 310 and rear passageway 330 are in fluid communication with the annular passageway 140. The annular passageway 140 has a stepped construction having a first diameter D1 proximate the front flange 122 and a second diameter D2 proximate the middle and rear passageways 320 and 330. The annular passageway 140 necks down further, then expands to a third diameter D3 proximate the rear flange 114. The annular passageway 140 includes a first coaxial annular tube 142 and a second coaxial annular tube 144. The rim of the first coaxial annular tube 142 and the rim second coaxial annular tube 144 may have varied distances from the rim of the rear flange member 114. The first coaxial annular tube 142 comprises a series of perforations 146 circumferentially staggered around the rim of the first coaxial annular tube. The series of perforations 146 lead to the channels 320 and openings 128 of the annular ring 126. Passageways 310 and 330 lead into the annular passageway 140 of the coaxial tube 142, as shown in FIG. 6.

Figures 7A, 7B:
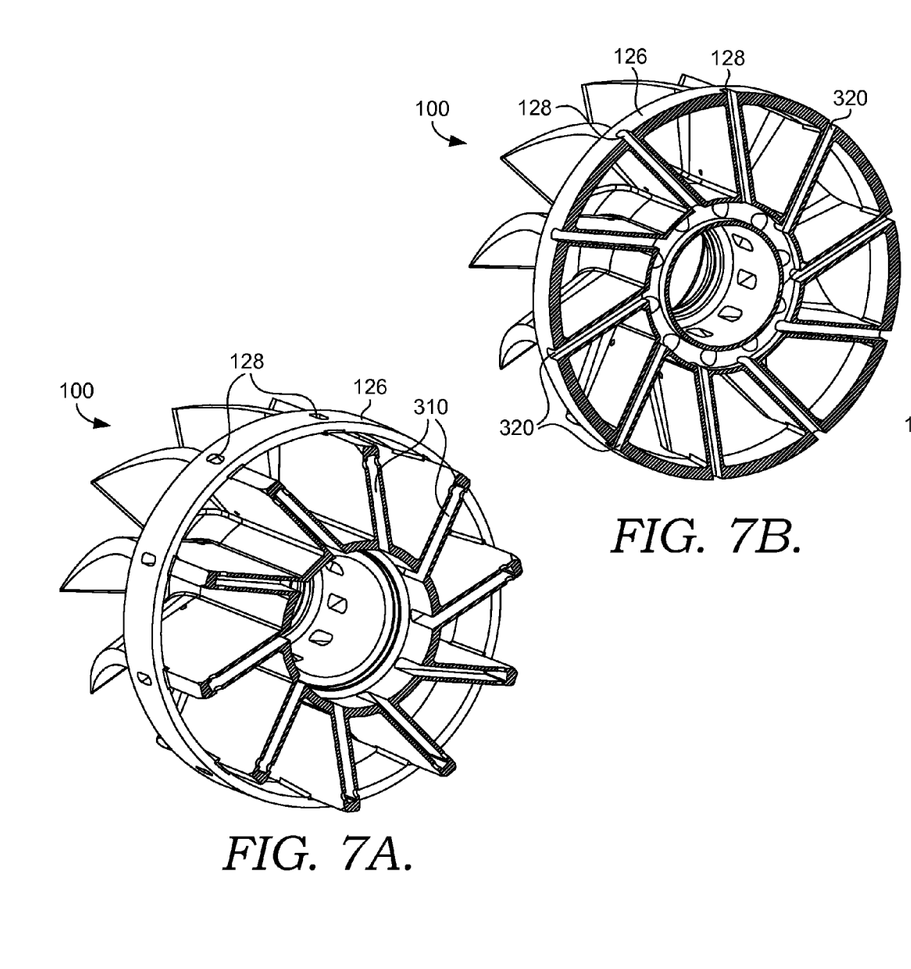
FIGS. 7A, 7B and 7C are cross section views of the swirler in accordance with an embodiment of the present invention.
Figure 7C:
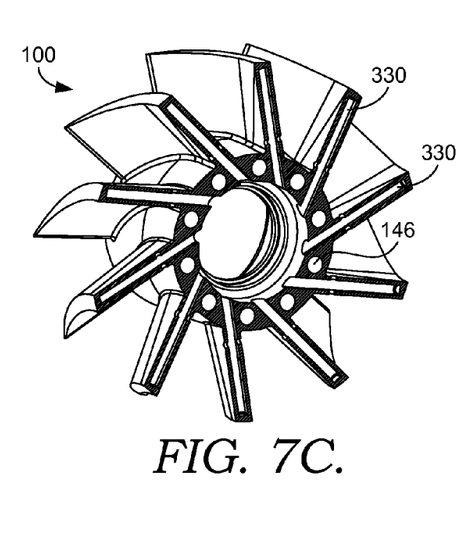

With reference to FIGS. 7A-7C, the swirler portion 100 of a fuel nozzle assembly is depicted in various cross section views. FIG. 7A depicts a cross section through the swirler 100 where the cross section is taken through leading edge passageway 310. FIG. 7B depicts a cross section through the swirler 100 taken through the middle passageway 320. Further, FIG. 7B shows the annular ring 126 including a plurality of openings 128 where the openings 128 open the channels 320 and perforations 146 to the surrounding air around the swirler 100

Figure 5:
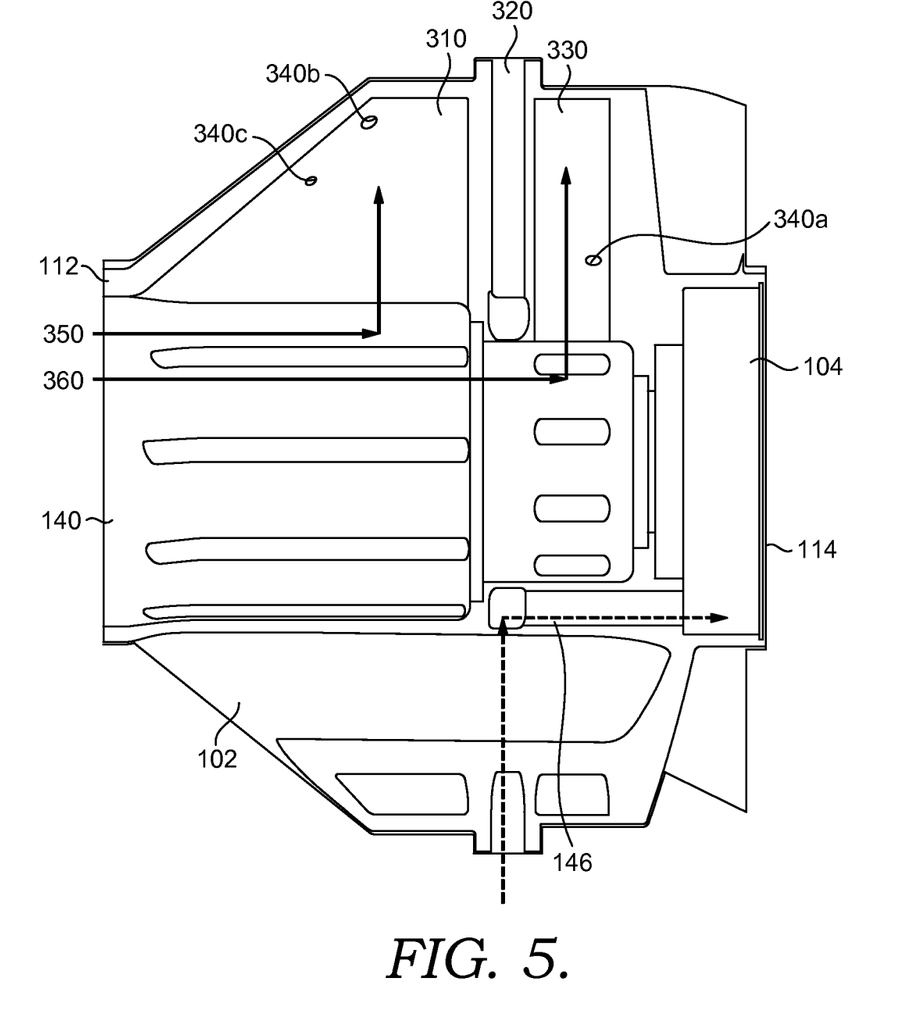
FIG. 5 is a cross section view of a swirler in accordance with an embodiment of the present invention.

Referring to FIG. 5, the fuel nozzle assembly comprises a plurality of vanes 102 connected to a core 104. The annular ring 126 surrounding the plurality of vanes 102 at a radially outer portion of each vane has been removed for clarity. Each vane 102 includes a leading edge passageway 310, a middle passageway 320, and a rear passageway 330. Fuel is injected through the core 104 and is then directed through the vanes 102, where it is injected through a plurality of apertures 340a, 340b, and 340c, as shown in FIG. 4. The above-described injection configuration generates a broad spectrum of gas residence time between the point of fuel injection and the flame front while controlling the fuel-air ratio profile at the exit of the nozzle. In particular, each of a plurality of apertures 340a, 340b, 340c on each vane is axially staged at different planes along the vane 102, such that mixing occurs at different planes. In one embodiment, a first fuel stream 350 is directed to the leading edge passageway 310 and the plurality of apertures 340b and 340c in the leading edge passageway 310. A second fuel stream 360 is directed to rear passageway 330 and the aperture 340a. The middle passageway 320 may be used as a channel for air or a fuel-air mixture to enter through the vanes 102 and pass into one or more of a series of perforation 146 in the core 104. Achieving a spectrum of gas residence time can be a useful knob to dampen pressure fluctuations or combustion dynamics inside the combustor by decoupling the resonance mechanism between heat release fluctuations at the flame front and gas flow fluctuations at the injection point. The present invention achieves a controlled mixed fuel-air ratio profile while concurrently axially injecting fuel.

Figure 8:
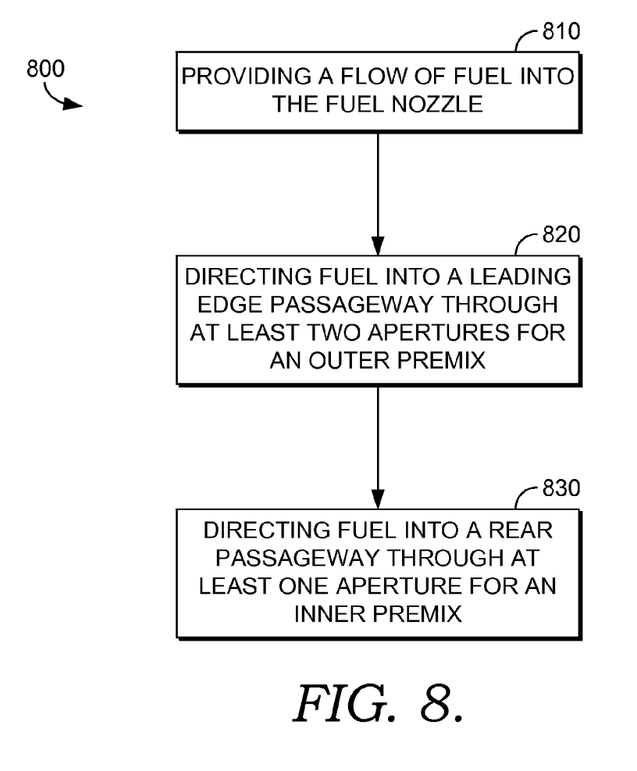
FIG. 8 is diagram depicting a method of axially injecting fuel using a fuel nozzle.
Figure 9:
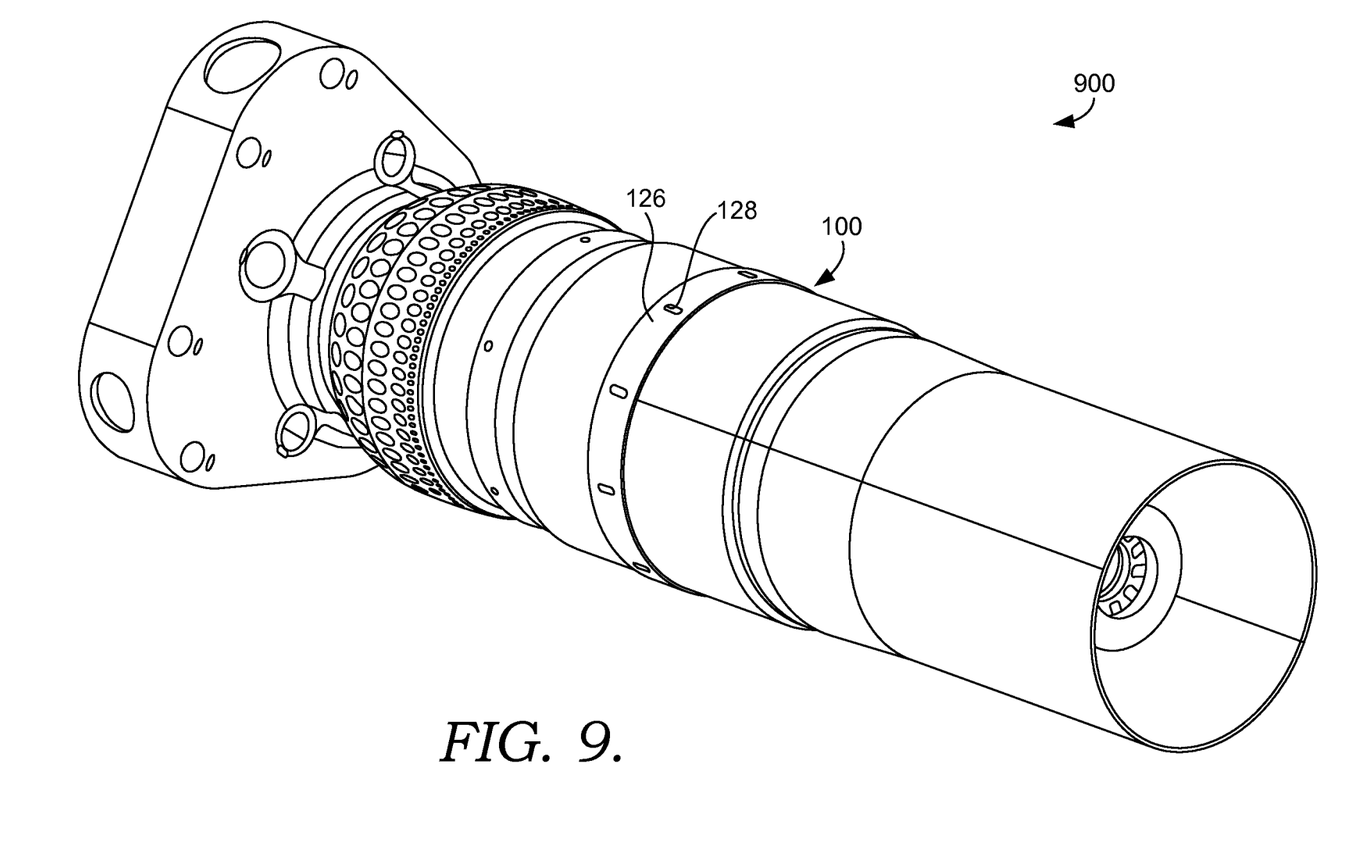
FIG. 9 is a perspective view of a fuel nozzle assembly in accordance with an embodiment of the present invention.

Referring now to FIG. 8, a method 800 of axially injecting fuel using a fuel nozzle. The method comprises a step 810 in which a flow of fuel is provided to a fuel nozzle having a plurality of vanes connected to a core. Each of the plurality of vanes having a plurality of apertures staggered axially on different planes along each vane. Each of the plurality of apertures connected to at least one of a plurality of passageways within each vane. Each vane further includes an appendage comprising a trailing edge defining a bend upstream stretching proximate a rear flange member of the core and a trunk comprising a leading edge defining a bevel extending upwardly from proximate a front flange member of the core, the trunk connected at an attachment portion to an annular ring connectedly surrounding the plurality of vanes.

In a step 820, fuel is directed to a leading edge passageway for an outer premix. The outer premix may be through at least two apertures of the leading edge passageway, where the at least two apertures are axially spaced apart. The leading edge passageway of the plurality of passageways defines an expanding gap expanding radially inward from a top portion of the trunk to the bottom portion of the trunk where the expanding gap corresponds at least in part, to the bevel of the leading edge.

In a step 830, fuel is directed to a rear passageway for an inner premix. The inner premix may be through at least one aperture on the rear passageway. The rear passageway is located proximate the trailing edge of the appendage before the bend upstream.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A fuel nozzle assembly for a gas turbine combustor comprising a swirler having a plurality of vanes extending radially outward from a core, each of the plurality of vanes having:
a plurality of axially spaced interior passageways including a leading edge passageway, a middle passageway, and a rear passageway, wherein the middle passageway is downstream of the leading edge passageway and upstream of the trailing edge passageway;
a plurality of apertures located in a sidewall of the vane, the plurality, of apertures including a first aperture, a second aperture, and a third aperture, wherein the plurality of apertures are staggered at different axial planes along each vane, wherein each of the plurality of apertures is connected to one of the plurality of axially spaced interior passageways within each vane, wherein the first aperture is connected to the trailing edge passageway, wherein the second aperture and the third aperture are connected to the leading edge passageway, and wherein the second aperture is radially and axially spaced apart from the third aperture;
an appendage extending from each of the vanes and comprising a trailing edge and a curved portion upstream of the trailing edge; and
a trunk portion extending forward and having a rounded leading edge extending radially outward proximate a front flange member of the core to a radially outer surface of the vane.

2. The fuel nozzle of claim 1, wherein the first aperture is located at a radially inward portion of the appendage before the bend, and wherein the second aperture and the third aperture e located in the trunk and spaced axially and radially apart proximate the leading edge of the trunk.

3. The fuel nozzle of claim 2, wherein a leading edge passageway expands downward towards the core, the leading edge passageway corresponding at least in part to the rounded leading edge.

4. The fuel nozzle of claim 3, wherein the rear passageway is connected to the first aperture, and wherein the rear passageway is located proximate the trailing edge of the appendage before the curved portion.

5. The fuel nozzle of claim 4, wherein the middle passageway is connected to an opening of an annular ring, wherein the middle passageway is located proximate a substantially center portion of the vane.

6. The fuel nozzle of claim 1, wherein the core extends along a center axis from a rear flange member to the front flange member defining an annular passageway, the annular passageway comprising a first coaxial annular tube and a second coaxial annular tube, wherein the first coaxial annular tube comprises a series of perforations circumferentially staggered around a rim of the first coaxial annular tube.

7. The fuel nozzle of claim 6, wherein the series of perforations define pathways in the first coaxial annular tube.

8. The fuel nozzle of claim 6, wherein the middle passageway has a radial component and an axial component, the axial component positioned between the first coaxial annular tube and the second coaxial annular tube.

9. The fuel nozzle of claim 1, wherein a portion of the trunk of each of the plurality vanes wholly defines a trunk attachment portion between an annular ring and the plurality of vanes, and wherein each of a plurality of openings on the annular ring define an annular ring attachment portion to a corresponding trunk attachment portion forming a channel to the core.

10. A fuel nozzle in a gas turbine combustor, the fuel nozzle assembly comprising:
a core extending along a center axis from a rear flange member to a front flange member defining an annular passageway, the annular passageway comprising a first coaxial annular tube and a second coaxial annular tube, wherein the first coaxial annular tube comprises a series of perforations circumferentially staggered around a rim of the first coaxial annular tube;

a plurality of vanes connected to the core, each of the plurality of vanes having:
  a plurality of axially spaced interior passageways including a leading edge passageway, a middle passageway, and a rear passageway, wherein the middle passageway is downstream of the leading edge passageway and upstream of the trailing edge passageway;
  a plurality of apertures located in a sidewall of the vane, the plurality of apertures including a first aperture, a second aperture, and a third aperture, wherein the plurality of apertures are staggered axially on different planes along each vane, wherein each of the plurality of apertures is connected to one of the plurality of axially spaced interior passageways within each vane, wherein the first aperture is connected to the trailing edge passageway, wherein the second aperture and the third aperture are connected to the leading edge passageway, and wherein the second aperture is radially and axially spaced apart from the third aperture;
  an appendage comprising a trailing edge defining a bend upstream stretching proximate a rear flange member of the core; and
  a trunk comprising a leading edge extending upwardly proximate a front flange member; and
an annular ring connectedly surrounding the plurality of vanes.

11. The fuel nozzle of claim 10, wherein a substantially center portion of the trunk of each of the plurality vanes wholly defines a trunk attachment portion where the annular ring connects to the plurality of vanes.

12. The fuel nozzle of claim 10, wherein the annular ring further comprises a plurality of openings on the annular ring.

13. A method of axially staging fuel injection in a fuel nozzle, the method comprising:
  providing a flow of fuel into the fuel nozzle having a plurality of vanes connected to a core, each of the plurality of vanes having:
    a plurality of axially spaced interior passageways including a leading edge passageway, a middle passageway, and a rear passageway, wherein the middle passageway is downstream of the leading edge passageway and upstream of the trailing edge passageway;
    a plurality of apertures located in a sidewall of the vane the plurality of apertures including a first aperture, a second aperture, and a third aperture, wherein the plurality of apertures are staggered at different axial planes, wherein each of the plurality of apertures is connected to at least one of the plurality of axially spaced interior passageways within each vane, wherein the first aperture is connected to the trailing edge passageway, wherein the second aperture and the third aperture are connected to the leading edge passageway, and wherein the second aperture is radially and axially spaced apart from the third aperture;
    an appendage comprising a trailing edge defining a bend upstream stretching proximate a rear flange member of the core; and
    a trunk comprising a leading edge extending upwardly proximate a front flange member of the core, the trunk connected at an attachment portion to an annular ring connectedly surrounding the plurality of vanes;
  directing fuel into the leading edge passageway for an outer premix through at least one of the plurality of apertures; and
  directing fuel into the rear passageway for an inner premix through at least one of the plurality of apertures.

14. The method claim 13, wherein the leading edge passageway defines an expanding gap expanding downwardly from a op portion of the trunk to a bottom portion of the trunk, the expanding gap corresponds, at least in part, to a bevel of the leading edge.

15. The method of claim 13, wherein the first aperture is located at a bottom portion of the trunk proximate the trailing edge of the appendage upstream of the bend and the second and third apertures are located adjacent the bevel proximate the leading edge of the trunk and in different axial planes.

16. The method of claim 15, wherein the rear passageway is located proximate the trailing edge of the appendage.

17. The method of claim 13, wherein the middle passageway extends at least partially in a radial direction.

18. The method of claim 17 further comprising directing air or a fuel-air mixture from the middle passageway and through a series of perforations on a first coaxial annular tube; and directing fuel through a second coaxial annular tube, wherein the first coaxial annular tube and the second coaxial annular tube are positioned in an annular passageway of the core defined from the rear flange member extending to the front flange member, wherein the series of perforations are circumferentially staggered around a rim of the first coaxial annular.

\* \* \* \* \*